United States Patent
Demo et al.

(10) Patent No.: US 9,139,142 B2
(45) Date of Patent: Sep. 22, 2015

(54) THREE-LAYER ACOUSTIC INSULATOR

(71) Applicant: Cadillac Products Automotive Company, Troy, MI (US)

(72) Inventors: Michael Demo, Macomb Township, MI (US); James Check, Armada, MI (US)

(73) Assignee: Cadillac Products Automotive Company, Troy, MI (US)

( * ) Notice: Subject to any disclaimer, the term of this patent is extended or adjusted under 35 U.S.C. 154(b) by 75 days.

(21) Appl. No.: 14/205,603

(22) Filed: Mar. 12, 2014

(65) Prior Publication Data

US 2014/0265413 A1 Sep. 18, 2014

Related U.S. Application Data

(60) Provisional application No. 61/787,068, filed on Mar. 15, 2013.

(51) Int. Cl.
*B60R 13/08* (2006.01)
*G10K 11/168* (2006.01)

(52) U.S. Cl.
CPC .......... *B60R 13/0815* (2013.01); *G10K 11/168* (2013.01)

(58) Field of Classification Search
CPC .. B60R 13/0815; B60R 13/08; G10K 11/168; G10K 11/165; G10K 11/162; G10K 11/172; G10K 11/002; G10K 11/28
USPC ................ 296/39.3, 181.6, 901.01; 52/794.1, 52/795.1

See application file for complete search history.

(56) References Cited

U.S. PATENT DOCUMENTS

| | | | |
|---|---|---|---|
| 19,840 A | 4/1858 | Geisendorff | |
| 4,655,496 A | 4/1987 | Gahlau et al. | |
| 5,824,974 A | 10/1998 | Campbell | |
| 6,109,389 A * | 8/2000 | Hiers et al. | 181/290 |
| 6,631,785 B2 * | 10/2003 | Khambete et al. | 181/290 |
| 6,808,045 B2 | 10/2004 | Campbell | |
| 6,951,263 B2 | 10/2005 | Blomeling et al. | |
| 7,070,848 B2 * | 7/2006 | Campbell | 428/137 |
| 7,971,683 B2 | 7/2011 | Bayle et al. | |
| 2005/0046217 A1 | 3/2005 | Campbell | |
| 2005/0046218 A1 | 3/2005 | Campbell | |
| 2010/0065366 A1 | 3/2010 | Soltau et al. | |
| 2012/0255809 A1 * | 10/2012 | Inoue et al. | 181/290 |

FOREIGN PATENT DOCUMENTS

CN    203078442 U    7/2013

* cited by examiner

*Primary Examiner* — Joseph D Pape
*Assistant Examiner* — Dana Ivey
(74) *Attorney, Agent, or Firm* — Harness, Dickey & Pierce, P.L.C.

(57) ABSTRACT

A 3-layer acoustic insulator system includes an acoustic de-coupler layer, a film acoustic barrier layer connected to the de-coupler layer, and a microfiber acoustic absorber layer connected to an opposite side of the barrier film layer as the acoustic de-coupler layer. The acoustic de-coupler layer is positioned in direct contact with a vehicle component and mimics the geometry of the vehicle component. The acoustic absorber layer is positioned on a passenger compartment facing side of the vehicle component.

7 Claims, 4 Drawing Sheets

THREE-LAYER ACOUSTIC INSULATOR

CROSS-REFERENCE TO RELATED APPLICATIONS

This application claims the benefit of U.S. Provisional Application No. 61/787,068, filed on Mar. 15, 2013. The entire disclosure of the above application is incorporated herein by reference.

FIELD

The present disclosure relates to acoustic attenuation systems used in automobile vehicles including light passenger vehicles and light duty trucks.

BACKGROUND

This section provides background information related to the present disclosure which is not necessarily prior art.

Vehicle manufacturers in the past relied on two layers of foam and/or "shoddy" material built up for lightweight constructions, in thicknesses of approximately one-fourth inch to multiple inches, which were applied in a blanket form to cover surface areas of the vehicle, such as the engine firewall and transmission tunnel, to attenuate vehicle and road noise entering the vehicle passenger compartment. When fuel economy concerns were not as stringent and higher horsepower engines were used, the attenuation systems could be thicker, increasing both their weight and thereby their noise attenuation capability, without significant impact on vehicle performance. As vehicle mile-per-gallon fuel rates have increased and horsepower ratings have decreased, attenuation system weight allowances have necessarily decreased, forcing attenuation system manufacturers to use lighter weight materials. Attenuation system weight has subsequently decreased, but at a tradeoff with acoustic attenuation achieved. It has therefore become desirable to provide acoustic attenuation systems that provide attenuation levels similar to the prior thicker/heavier designs while providing the benefits of reduced weight.

SUMMARY

This section provides a general summary of the disclosure and is not a comprehensive disclosure of its full scope or all of its features.

According to several aspects, a 3-layer acoustic insulator system includes an acoustic de-coupler layer. A film acoustic barrier layer is connected to the de-coupler layer. A microfiber acoustic absorber layer is connected to the barrier film layer and is oppositely directed with respect to the acoustic de-coupler layer.

According to other aspects, the acoustic de-coupler layer is positioned in direct contact with a vehicle component and mimics the geometry of the vehicle component, with the acoustic absorber layer on a passenger compartment facing side of the vehicle component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
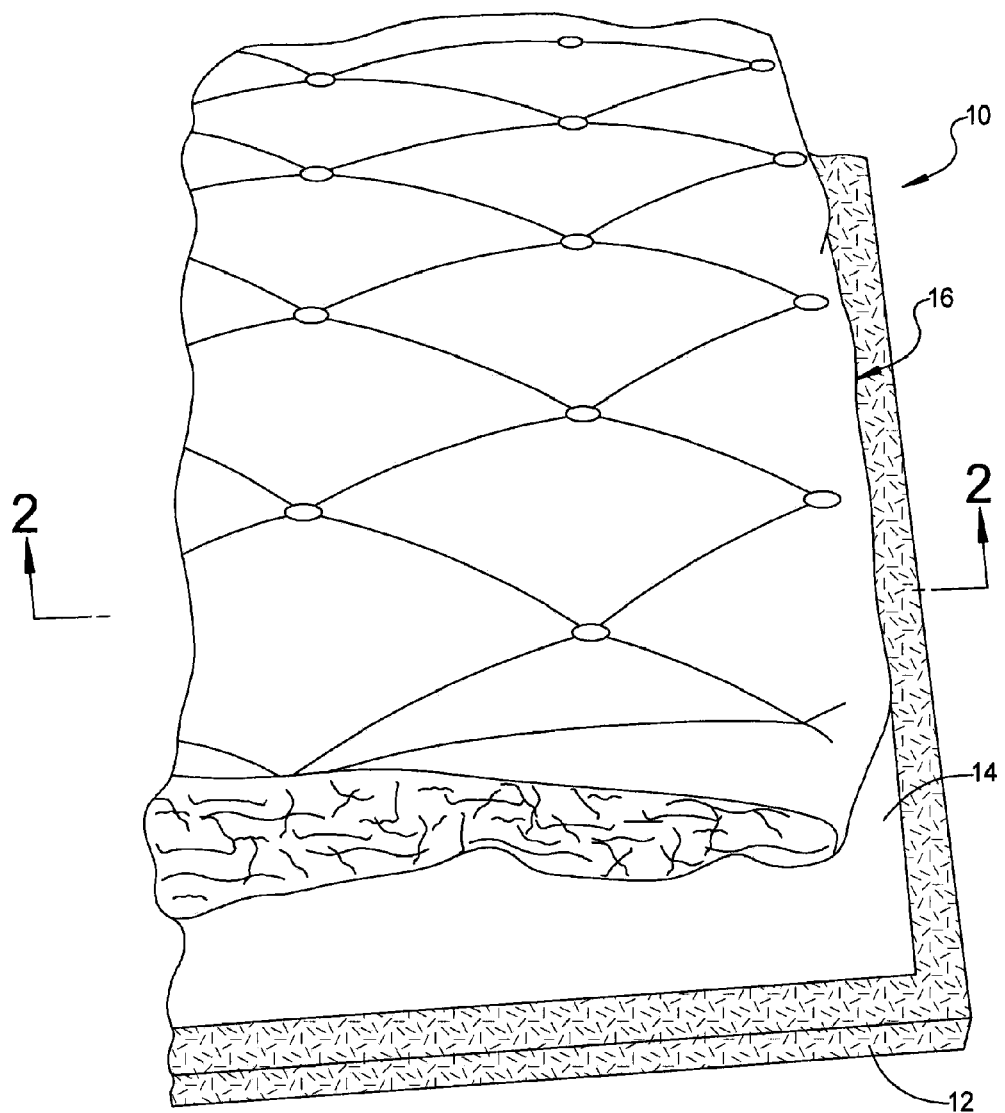
FIG. 1 is a top perspective view of a 3-layer acoustic insulator system of the present disclosure.

Referring to FIG. 1, a 3-layer acoustic insulator system 10 includes an acoustic de-coupler layer 12, a plastic film acoustic barrier layer 14 connected to the acoustic de-coupler layer 12, and a microfiber acoustic absorber layer 16 connected to the acoustic barrier layer 14 which is oppositely directed about the acoustic barrier layer 14 with respect to the acoustic de-coupler layer 12. The acoustic de-coupler layer 12 can include materials such as polyester fiber, cotton, and/or a foam material. The acoustic barrier layer 14 is a film of a polymeric material such as polyethylene, EVA, and any other thermoplastic or thermoset materials. The microfiber acoustic absorber layer 16 includes polypropylene microfibers which can be bounded by an acoustical scrim on one or both sides for strength and to protect the microfibers. According to several aspects, the 3-layer microfiber acoustic absorber layer 16 can be a commercially available product identified, for example, as AutoZorb™ which is available from AIMs; SonoZorb™ which is available from GDC, Inc.; or Thinsulate™ which is available from the 3M Corporation. Use of three layers, referenced above, in creating the acoustic insulator system 10 can provide a thermoformed barrier acoustic assembly. The layers can be joined to each other by heat and pressure, by bonding, by adhesive, by fastening, or by other suitable means.

Figure 2:
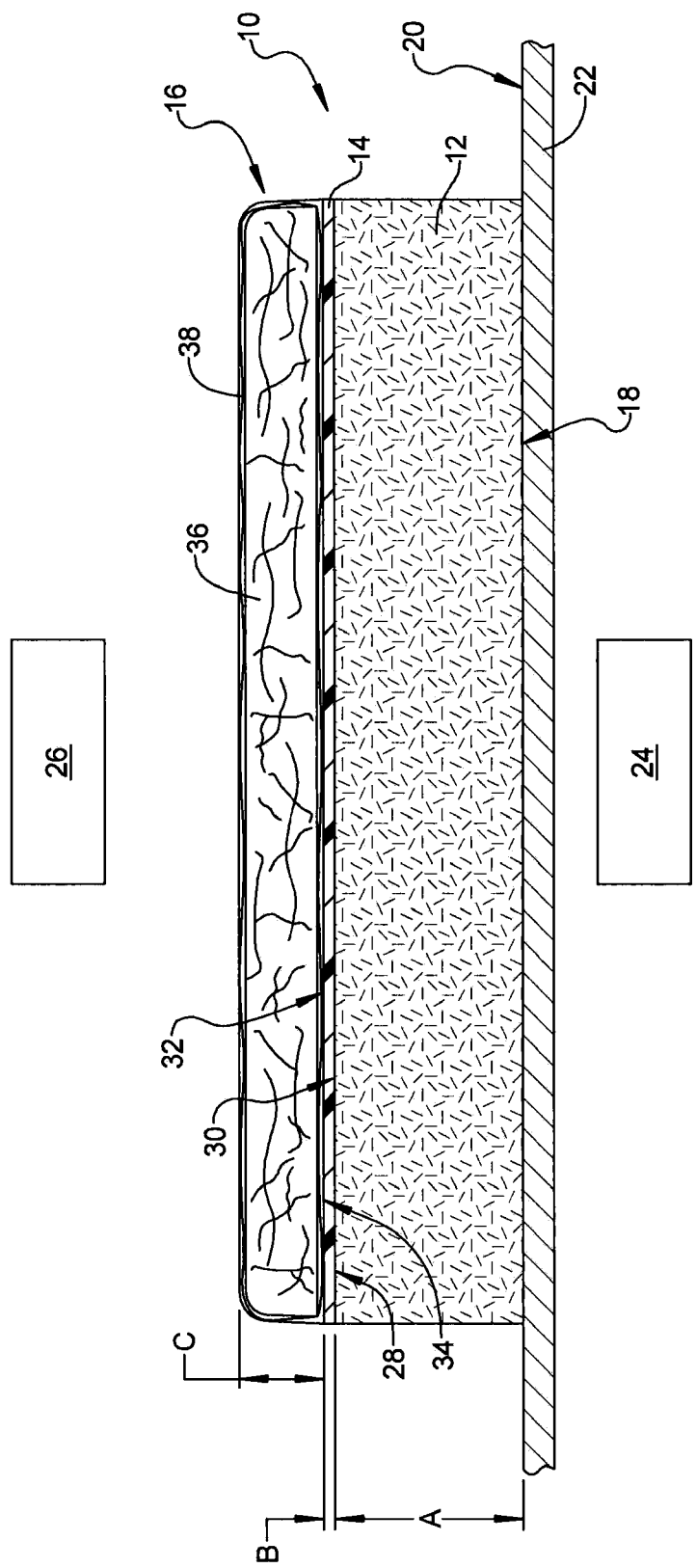
FIG. 2 is a front elevation cross sectional view taken at section 2 of FIG. 1.

Referring to FIG. 2, the acoustic de-coupler layer 12 has a face 18 which is positioned in direct contact with a surface 20 of a vehicle component 22, such as an engine firewall, a transmission tunnel, or a vehicle body panel. Vehicle component 22 is positioned between a noise source 24, such as a vehicle engine, and a passenger compartment 26, wherein acoustic performance criteria are predetermined by the vehicle manufacturer. Noise source 24 can also be, but is not limited to, road noise, tire noise, and/or wind noise, or a combination of these noise sources. Vehicle component 22 is shown as a planar metal panel component for simplicity of presentation; however, vehicle component 22 can have any geometric form including planar, curved, rough, wavy, and the like, or can also have a free form. The material of acoustic de-coupler layer 12 is selected and intended to take on and mimic the shape of vehicle component 22 and retain this shape, thereby acting as an air-gap between the vehicle component 22 and the acoustic barrier layer 14. A thickness "A" of acoustic de-coupler layer 12 can range from approximately 2 mm up to approximately 40 mm, and can vary over the width and length of acoustic de-coupler layer 12 to accommodate compression due to local space restrictions, such as ventilation system ducting, electrical cableways, and the like.

With continuing reference to FIG. 2, an opposite second face 28 of acoustic de-coupler layer 12 is connected, such as by bonding, to a first surface 30 of the acoustic barrier layer 14. Acoustic barrier layer 14 can deflect to mimic the shape of vehicle component 22. The most rigid components of the 3-layer acoustic insulator system 10 are acoustic de-coupler layer 12 and barrier layer 14. Acoustic barrier layer 14 can also be thermoformed to match a contour of vehicle component 22. The acoustic barrier layer 14 is nominally the thinnest layer of the 3-layer acoustic insulator system 10, having a nominal thickness "B" of approximately 0.40 mm, but can range from approximately 0.03 to approximately 1.0 mm.

An oppositely directed second surface 32 of the acoustic barrier layer 14 can be positioned in direct contact with a face 34 of the microfiber acoustic absorber layer 16. Face 34 can define a surface of a layer of polypropylene microfibers 36. Face 34 can also define a surface of a scrim 38, which according to further aspects can completely surround the polypropylene microfibers 36. Microfiber acoustic absorber layer 16 has a thickness "C" which can range from approximately 5 mm to approximately 25 mm. The polypropylene microfibers 36 create tortuous path layers which limit air passage through microfiber acoustic absorber layer 16 while converting the energy of the air flow into thermal energy, thereby absorbing a portion of the sound energy of the noise source.

Figure 3:
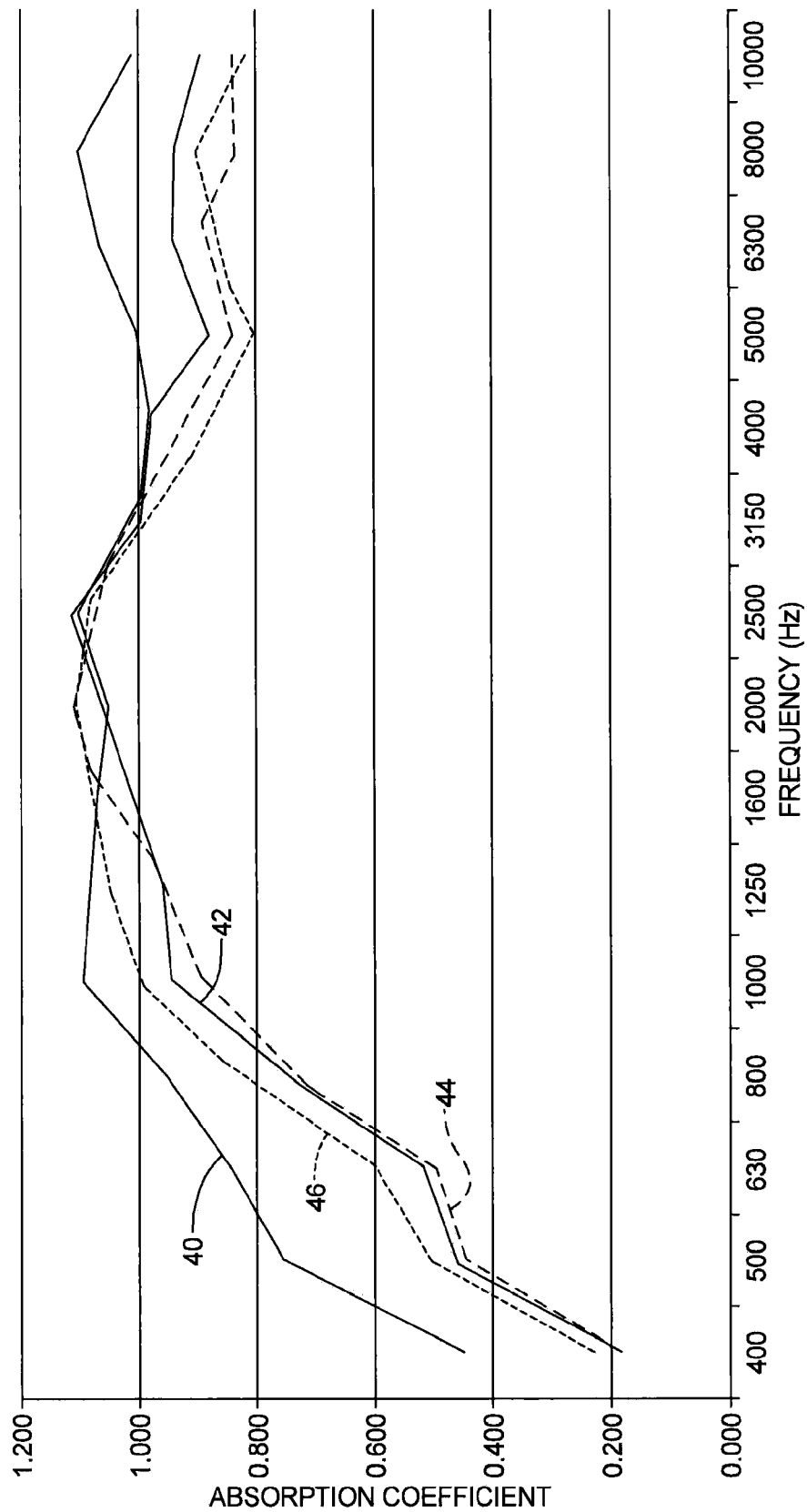
FIG. 3 is a graph of frequency and absorption coefficient for the 3-layer acoustic insulator system of FIG. 1.

Referring to FIG. 3 and again to FIGS. 1 and 2, exemplary OEM Standard Absorption Targets for an acoustic insulator system having a thickness of 20 mm (for a lightweight system) require a very high range performance. A first target curve 40 represents a 20 mm lightweight (1200 gsm to 2400 gsm) absorption goal representing very good performance, and a second target curve 42 represents a 20 mm lightweight absorption goal representing acceptable performance. A 3-layer acoustic insulator system 44, with a micro denier rider layer (microfiber acoustic absorber layer 16) at 18 mm thickness and air flow resistivity (AFR) of 950 rayls, provides performance within acceptable levels. A 3-layer acoustic insulator system 46, with a micro denier rider layer (microfiber acoustic absorber layer 16) at 20 mm thickness and AFR of 1100 rayls, also provides performance within acceptable levels.

Figure 4:
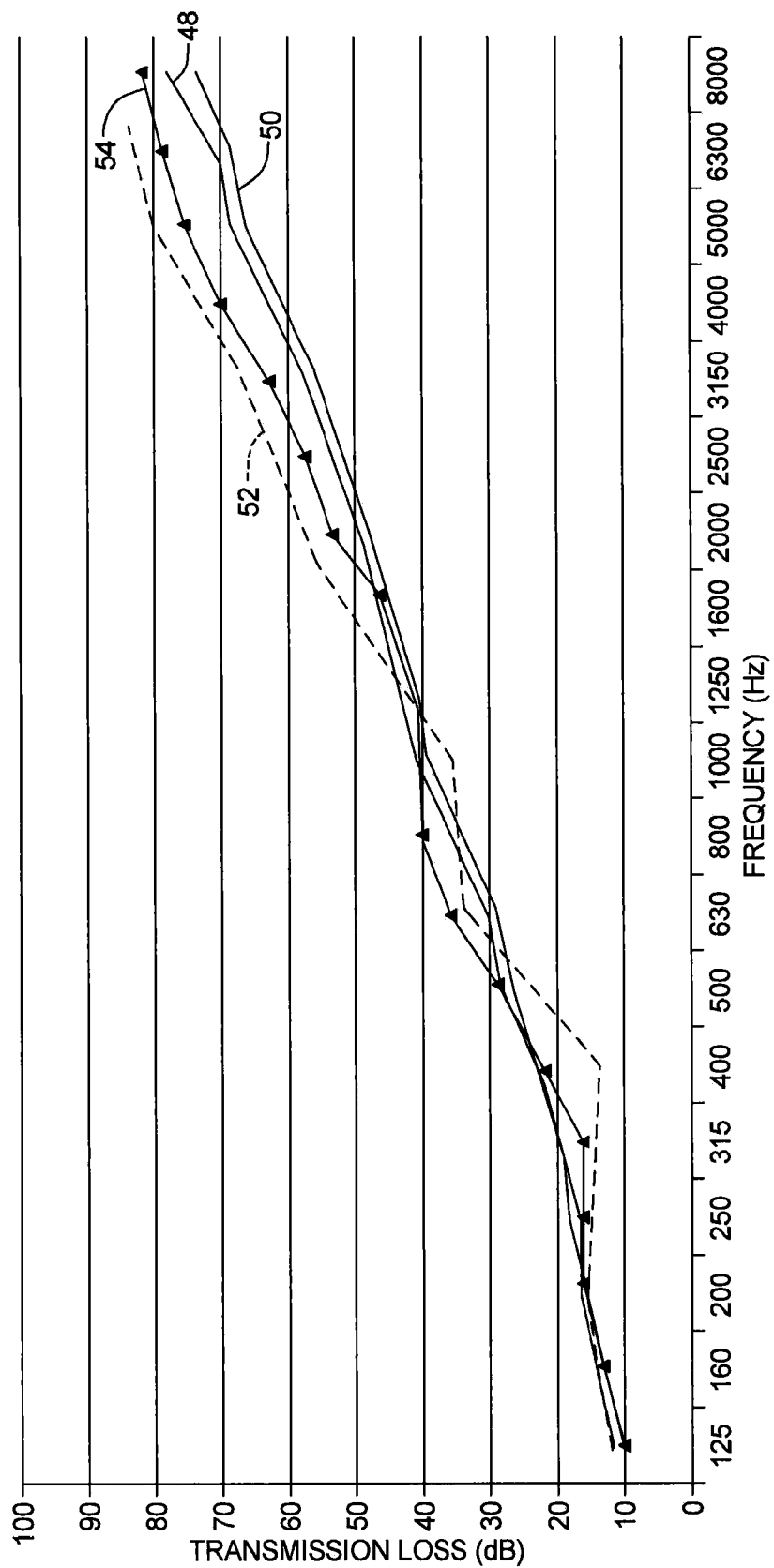
FIG. 4 is a graph of frequency and transmission loss for the 3-layer acoustic insulator system of FIG. 1.

Referring to FIG. 4 and again to FIGS. 1 and 2, exemplary OEM sound transmission loss targets require the use of at least a film/barrier within an acoustic composite. A first target curve 48 represents a 25 mm thickness high range goal, and a second curve 50 represents a 25 mm thickness low range goal differing by approximately 2 db. Target barrier performance of a 3-layer acoustic insulator system 52, having a 2000 gsm composite weight, indicates a 0.5 mm film thickness acoustic barrier layer 14 and an 18 mm thick microfiber acoustic absorber layer 16 exceeds the target performance. Target barrier performance of a 3-layer acoustic insulator system 54, with an 1800 gsm composite weight, indicates a 0.25 mm film thickness acoustic barrier layer 14 and a 18 mm thick microfiber acoustic absorber layer 16 also exceeds the target performance. System stiffness is provided in the bottom two layers—the acoustic de-coupler layer 12 and the film acoustic barrier layer 14.

Three-layer acoustic insulator systems of the present disclosure can also be modified to include multiple types of materials and meet a total system or composite weight of approximately 2000 gsm. For example, the microfibers in microfiber acoustic absorber layer 16 can be PP, PET, and/or PET/PP (up to 2 denier). Material used for acoustic barrier layer 14 can be PE, PP, PVC, EVA, and/or any thermoplastic or thermoset materials. Material of the de-coupler layer 12 can also be any moldable fiber or foam.

The system of the present disclosure provides several advantages, including providing a multi-layer system using a high efficiency microfiber with lightweight barriers, and moldable fibers. Known acoustic barrier constructions are biased either toward acoustic absorption or toward acoustic transmission loss and therefore do not give a balanced performance between acoustic absorption and transmission loss. The "tunability" of the present disclosure construction allows various performance targets to be met. The microfibers are not self-supporting; therefore, the structure of the system comes from the barrier film and the molded fibers. This provides for superior acoustic absorption on the passenger side of a vehicle and noise reduction through transmission loss due to the decoupled barrier film. "Tunability" is provided by the system which provides multiple different ways to meet OEM acoustic target values by varying fibers, films, and thicknesses of any or all of the three layers.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A 3-layer acoustic insulator system, comprising:
    an acoustic de-coupler layer;
    an acoustic barrier layer connected to the acoustic de-coupler layer, the acoustic barrier layer having a thickness that ranges from approximately 0.03 mm to approximately 1.0 mm to provide noise transmission obstruction; and
    an acoustic absorber layer made of a microfiber material and connected to the acoustic barrier layer and oppositely directed with respect to the acoustic de-coupler layer such that the acoustic barrier layer is disposed between the acoustic de-coupler layer and the acoustic absorber layer.

2. The 3-layer acoustic insulator system of claim 1, wherein the acoustic de-coupler layer is selected from materials including synthetic fiber, cotton, and/or foam material.

3. The 3-layer acoustic insulator system of claim 1, wherein the acoustic barrier layer is a continuous film of an elastomeric material including one of polyethylene, EVA, thermoplastic, or thermoset materials.

4. The 3-layer acoustic insulator system of claim 1, wherein the acoustic absorber layer includes polypropylene or any thermoplastic microfibers bounded by an acoustical scrim disposed on at least one side of the acoustic absorber layer opposite the acoustic barrier layer and the acoustic de-coupler layer.

5. The 3-layer acoustic insulator system of claim 1, wherein a thickness of the acoustic absorber layer ranges from approximately 5 mm to approximately 25 mm.

6. The 3-layer acoustic insulator system of claim 1, wherein the acoustic de-coupler layer is positioned in direct contact with a vehicle component and follows a geometry of the vehicle component.

7. The 3-layer acoustic insulator system of claim 1, wherein the acoustic absorber layer is positioned on a passenger compartment facing side of the vehicle component.

* * * * *